US006829687B2

(12) United States Patent
Pai

(10) Patent No.: US 6,829,687 B2
(45) Date of Patent: Dec. 7, 2004

(54) VOLUME DATA NET BACKUP

(75) Inventor: Ramachandra Pai, Beaverton, OR (US)

(73) Assignee: International Business Machines Corporation, Armonk, NY (US)

( * ) Notice: Subject to any disclaimer, the term of this patent is extended or adjusted under 35 U.S.C. 154(b) by 397 days.

(21) Appl. No.: 09/752,909

(22) Filed: Dec. 28, 2000

(65) Prior Publication Data

US 2002/0087812 A1 Jul. 4, 2002

(51) Int. Cl.⁷ .............................................. G06F 12/00
(52) U.S. Cl. ...................... 711/162; 711/100; 711/154; 711/161; 709/200; 709/223
(58) Field of Search ................. 709/200, 203, 709/223; 711/100, 154, 161, 162, 163

(56) References Cited

U.S. PATENT DOCUMENTS

| | | | | | |
|---|---|---|---|---|---|
| 5,572,709 | A | * | 11/1996 | Fowler et al. ................ | 703/27 |
| 5,621,884 | A | * | 4/1997 | Beshears et al. ............. | 714/10 |
| 5,742,825 | A | * | 4/1998 | Mathur et al. .............. | 719/329 |
| 5,857,208 | A | * | 1/1999 | Ofek .......................... | 707/204 |
| 6,167,531 | A | * | 12/2000 | Sliwinski .................... | 714/13 |
| 6,212,574 | B1 | * | 4/2001 | O'Rourke et al. .......... | 719/321 |
| 6,269,381 | B1 | * | 7/2001 | St. Pierre et al. .......... | 707/202 |
| 6,269,431 | B1 | * | 7/2001 | Dunham ..................... | 711/162 |
| 6,298,390 | B1 | * | 10/2001 | Matena et al. ............. | 719/315 |
| 6,353,878 | B1 | * | 3/2002 | Dunham ..................... | 711/162 |
| 6,397,308 | B1 | * | 5/2002 | Ofek et al. ................. | 711/162 |
| 6,434,681 | B1 | * | 8/2002 | Armangau .................. | 711/162 |
| 6,453,325 | B1 | * | 9/2002 | Cabrera et al. ............ | 707/204 |
| 6,460,144 | B1 | * | 10/2002 | Ashcroft et al. ............ | 714/4 |
| 6,490,598 | B1 | * | 12/2002 | Taylor ........................ | 707/204 |
| 6,601,186 | B1 | * | 7/2003 | Fox et al. ................... | 714/4 |
| 6,704,755 | B2 | * | 3/2004 | Midgley et al. ............ | 707/204 |
| 2001/0044904 | A1 | * | 11/2001 | Berg et al. ................. | 713/201 |

OTHER PUBLICATIONS

U.S. Provisional application Ser. No. 60/156,671.*
U.S. Provisional application Ser. No. 60/182,743.*
U.S. Provisional application Ser. No. 60/186,781.*

* cited by examiner

Primary Examiner—Tuan V. Thai
(74) Attorney, Agent, or Firm—Lieberman & Brandsdorfer, LLC

(57) ABSTRACT

A method and computer system for efficiently backing up data in a computer network. Multiple resources are grouped into nodes wherein each node includes a network adapter for allowing the node to communicate with the computer system. Each node includes a storage device, or multiple storage devices. The storage devices of each node are mapped with mirrors to form a logical volume. At least one mirror, also known as a plex is connected to both the logical volume and a network adapter for the respective node. For backup of data, the source node sends data to a target node through the network adapter. The target nodes receives data from the plex through the network adapter. In communication with the network adapter and the volume, the plex of the target node is configured to be a feed plex in that it acts as a communication pipe between the network adapter and the target node volume. Additionally, the target node volume is configured to be a feed volume for receiving data from a source node, wherein the data is replicated across all of the mirrors of the feed volume. In data restoration, the feed plex of the target node is configured as a plex and sends data from the feed volume of the target node to the network adapter. The plex of the source node in communication with the network adapter is now designated as a feed plex and the volume of the source node is now designated as a feed volume. The data from the network adapter of the source node is sent to the feed plex where it is sent to the associated feed volume. Accordingly, the direct communication of the plex of the source node and the target node with the respective network adapter provides for transfer of data across a kernel layer of both nodes without the need to access a user layer.

18 Claims, 4 Drawing Sheets

VOLUME DATA NET BACKUP

BACKGROUND OF THE INVENTION

1. Technical Field

This invention relates to data backup in computer systems, and more specifically to a method of transferring data across a network.

2. Description Of The Prior Art

Networked computer systems with interconnected nodes are an increasingly popular alternative computer architecture to more traditional computer architectures. A networked system may be a collection of individual computers known as nodes that are interconnected to provide a single computing system. FIG. 1 is an illustration of the layers of a node in a typical network environment. Each system node 10 in a networked computing environment includes a form of a physical storage device for storing data and generally may include multiple storage devices 12, 14. Traditionally, the storage devices will be in the form of a disk or tape. The storage devices 12, 14 are logically grouped into a volume 26 through the use of plexes 16 and 18. The volume 26 and plexes 16 and 18 are all maintained within a volume manager 28. The system 10 also has a network device 22 for communicating over the network with other nodes in the system. Accordingly, each node in the network includes physical storage devices for storing node data, plexes for communicating data in the storage devices to a volume which logically maps the data, and a network device for communicating across the network with other nodes in the system.

In a typical computer network environment, each node includes several layers in a program stack. A traditional model of a network environment for a two node system is shown in FIG. 2. Each node 110 and 130 has a physical devices layer 112, 132, respectively, where data storage devices 114, 116 and 134, 136, and network adapters 126, 146 are located. In addition to the physical devices layer 112, 132, each node includes a kernel layer 115, 135 and a user layer 120, 140, respectively. The user layer 120, 140 is the area where application programs 122, 142 are accessed. The kernel layer 115, 135 contains a volume manager layer 128, 148. The volume manager layer 128, 148 manages the flow of data in the storage devices to and from the application program 122, 142 in the user layer 120, 140, respectively. Accordingly, the program stack includes three primary layers for operating each node in the network.

The process of backing up data in a traditional two node network involves the following steps:

1. Data is copied from the physical devices layer 112 to the volume manager layer 128 of the kernel layer 115 of the source node 110;
2. Next, the data is copied from the volume manager layer 128 to the application program 122 in the user layer 120;
3. Data is then copied from the application program 122 in the user layer 120 through the kernel layer 115 to a network device 126;
4. The data is then copied from the network device 126 of the source node 110 across a communication pipe 150 to a network device 146 of the target node 130;
5. The data is then copied from the network device 146 through the kernel layer 135 to the application program 142 of the user layer 140;
6. Next, the data is copied from the application program 142 in the user layer 140 to the volume manager layer 148 in the kernel layer 135; and
7. Finally, the data is copied from the volume manager layer 148 of the kernel layer 135 of the target node 130 to the physical layer 132.

Accordingly, the traditional data backup method requires communication of the data through multiple layers of the program stack, including the user layer.

The disadvantage of this procedure is that there are multiple copies of data transferred from the kernel to the user layer and from the user layer to the kernel layer. This conventional method of backing up data on a storage device connected to some other machine on the network requires a series of copying, and is therefore inefficient due to the multiple copies of data involved. Accordingly, there is a need for an efficient method of backing up data on a computer system which is one of multiple nodes in a network, wherein multiple copies of the data need not be processed through the user layer of the nodes in the system.

SUMMARY OF THE INVENTION

It is therefore an object of the invention to provide a method of efficiently backing up and restoring data of a networked computer system. It is a further object of the invention to provide a storage device manager for use in networked computer systems for allowing internode data transfer through a kernel layer of the operating system.

A first aspect of the invention is a method for staring data from a network on a node. A first plex is connected to a network device, and a second plex is connected to a data storage device. Both plexes are grouping into a logical volume. Data is received from the network by the first plex and stored on the storage device by the second plex. The data is directly communicated from a kernel layer of a source node to a kernel layer of a target node.

A second aspect of the invention is a networked computer system. Each node in the system includes a data storage device, and first and second plexes. The first plex is connected to a network device and the second plex is connected to the data storage device. A volume is connected to both the first and second plexes adapted to directly communicate data from a kernel layer of a source node to a kernel layer of a target node.

A third aspect of the invention is an article comprising a computer-readable signal bearing medium with means for communicating to a networked computer system. The article includes two plexes. A first plex is connected to the communication means end the second plex is connected to a data storage device. Both the first and second plexes are connected to the volume. The article also includes means in the medium for managing a direct transfer of data from a kernel layer of a source node to a kernel layer of a target node.

Other features and advantages of this invention will become apparent from the following detailed description of the presently preferred embodiment of the invention, taken in conjunction with the accompanying drawings.

DESCRIPTION OF THE PREFERRED EMBODIMENT

Overview

Minimizing the quantity of copies of data produced in a backup of a storage device of a node in a computer network is essential for improving operating efficiency. Each node stores data in a logical volume which maps the data from a single or multiple storage devices through the use of a mirror, also known as a plex. Data from the logical volume of one node may be transferred to another logical volume of another node, i.e. target node, with the use of a mirror also known as a plex and a network adapter. Accordingly, data can be replicated across the mirrors of the volumes resident in separate nodes of a networked computer system.

Technical Background

Figure 1:
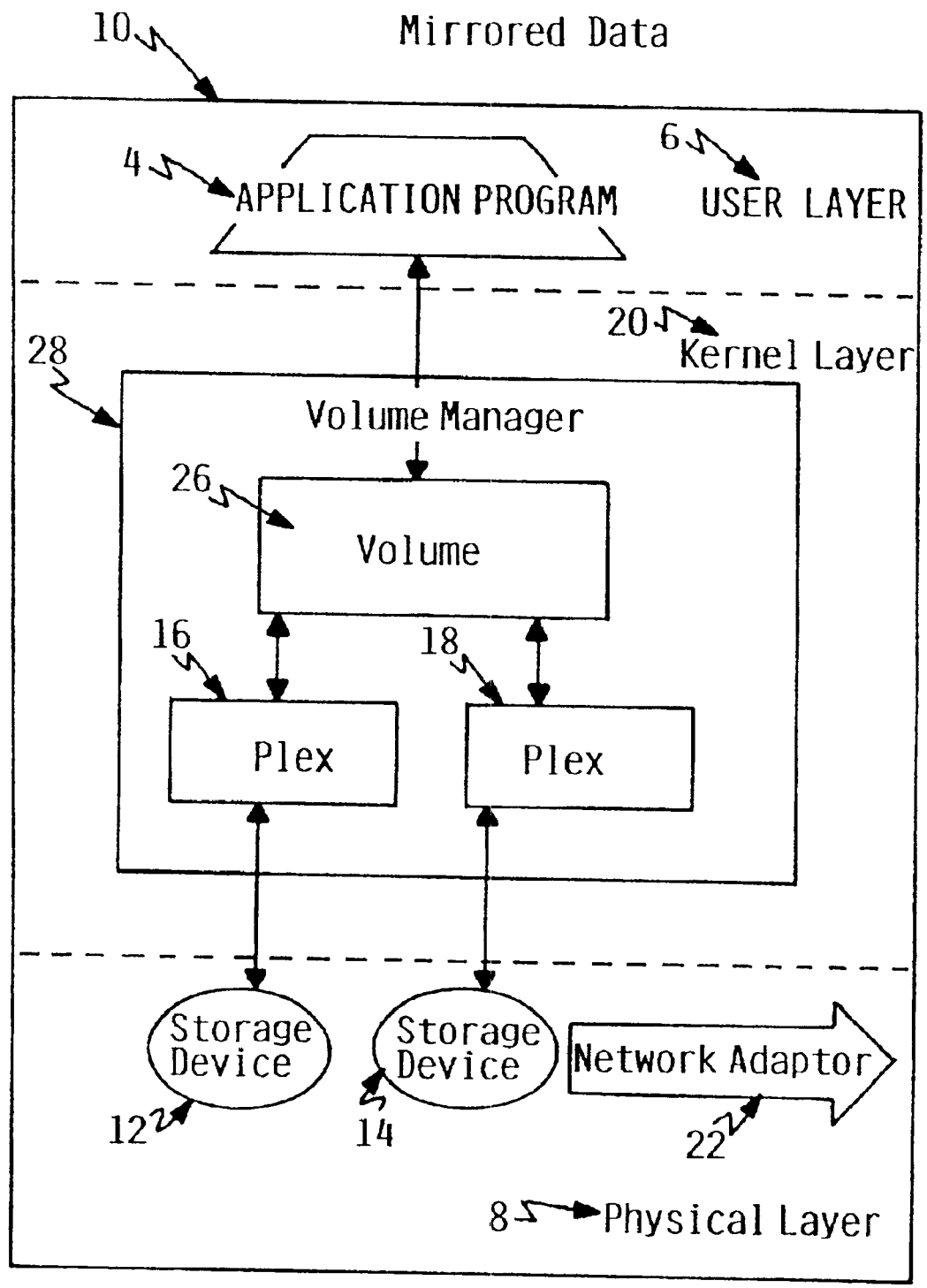
FIG. 1 is a block diagram of a prior art computer system with mirrored data.
Figure 2:
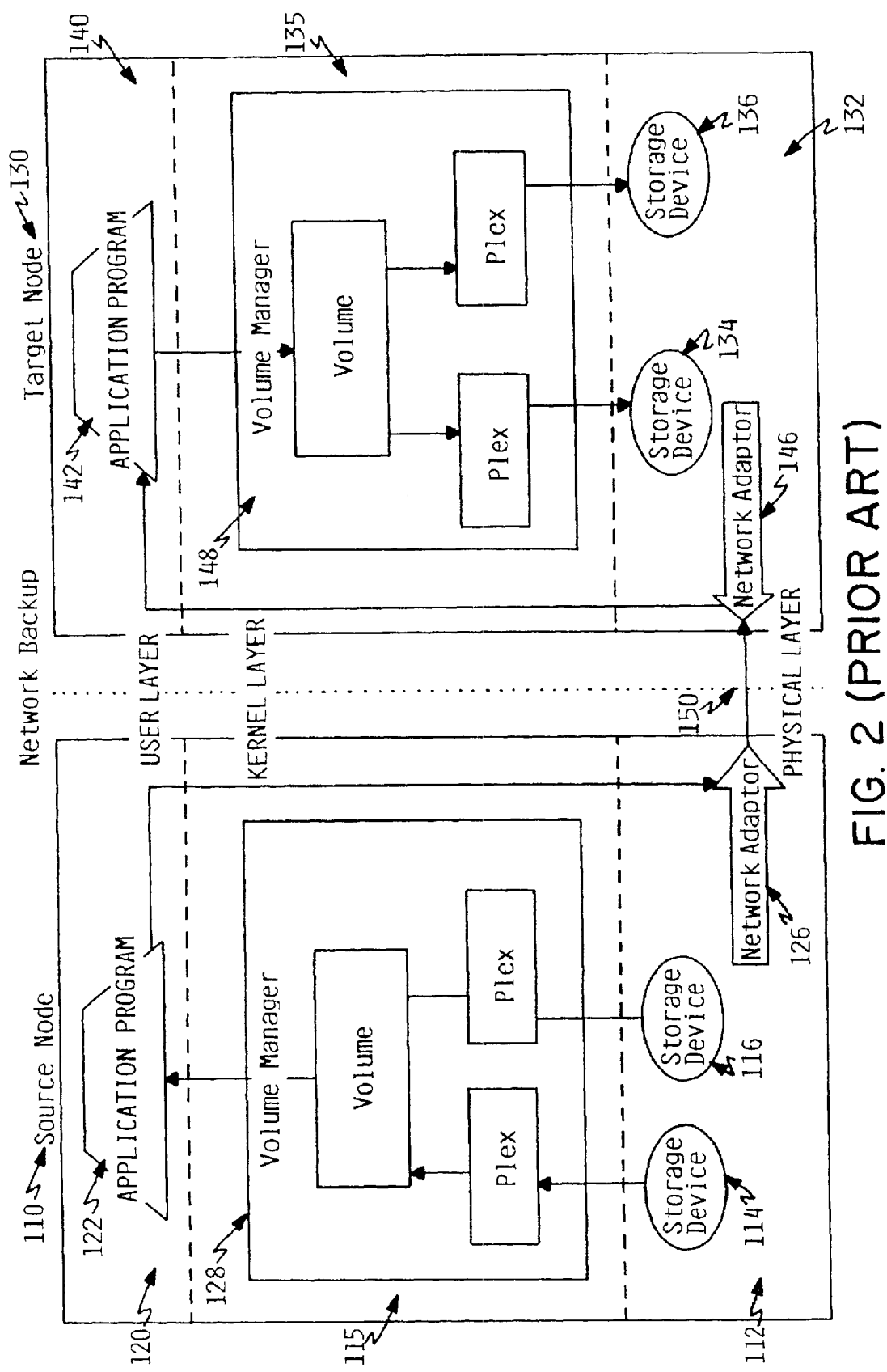
FIG. 2 is a block diagram of a prior art internode method of backing up data.

As illustrated in FIG. 1, each node 10 in a computer network is broken down into several layers of program operation. The user layer 6 of the program operation includes the application program 4. The physical layer 8 contains apparatus such as data storage devices 12, 14 for storing node data, and a network adapter 22 for physically connecting the node to other nodes in the network. The physical storage devices 12 and 14 read and write data associated with that particular node. The kernel layer 20 of the program operation contains plexes 16 and 18, and a volume 26. Both the plexes 16 and 18 and the volume 26 are maintained within a volume manager 28. The term plexes is synonymous with the term mirror. The volume 26 logically maps the data from the storage devices 12 and 14 through multiple mirrors 16 and 18. The mirrors 16 and 18 function to give redundant access to data in the particular volume 26. Writing to the volume 26 writes to all of the mirrors in the volume, and reading from the volume 26 uses one of the mirrors. Accordingly, for the purposes of this invention, a node 10 is an individual computer of a network having mirrored data.

Figure 3:
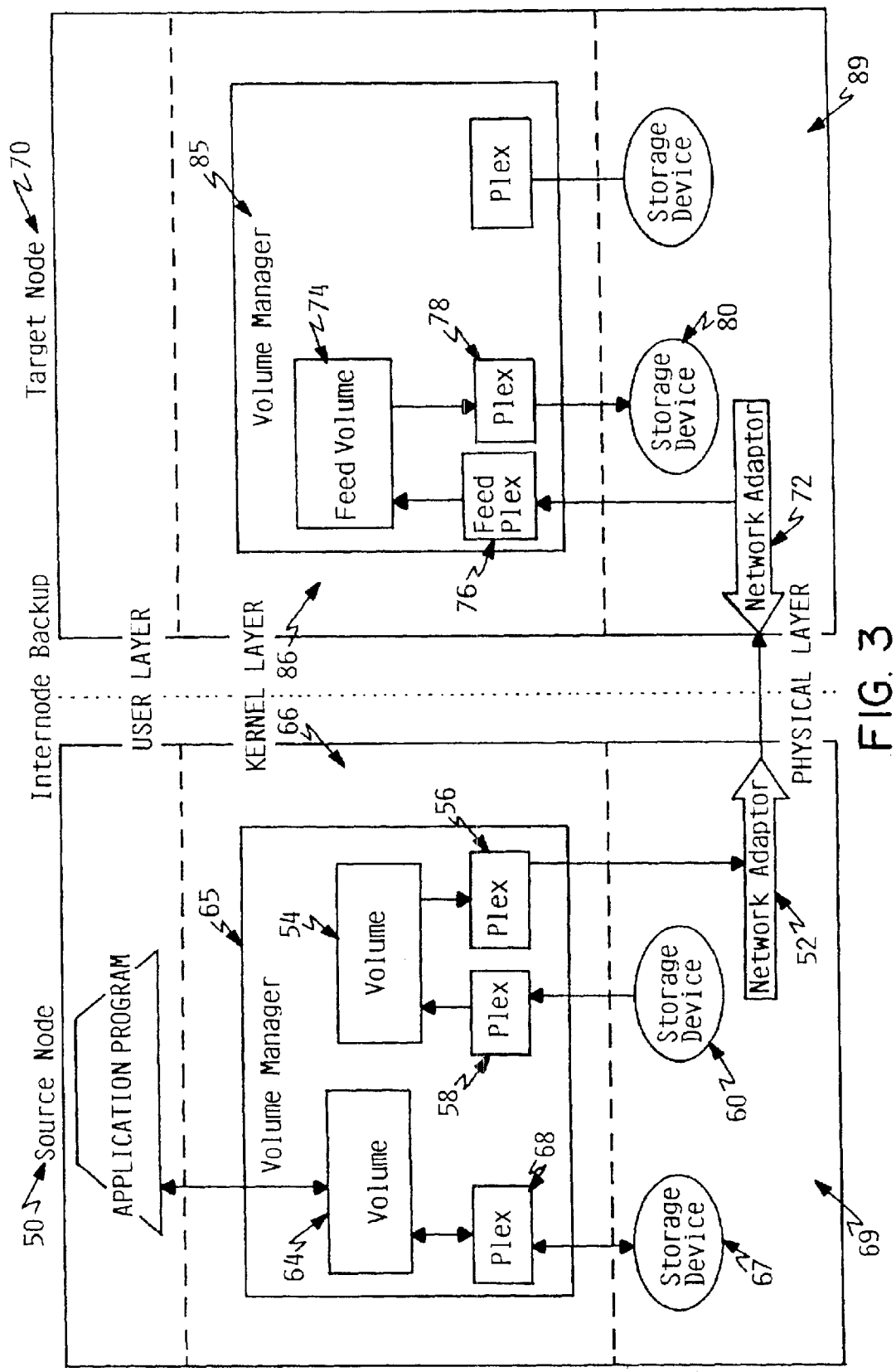
FIG. 3 is a block diagram of internode backup of data according to the preferred embodiment of this invention, and is suggested for printing on the first page of the issued patent.

FIG. 3 is an illustration of the preferred embodiment of the invention showing how two nodes on a network may be configured to back up data on a target node 70 in the network. In this illustration, node 50 is the source node and sends data to the target node 70, where the data is backed up. The data essentially travels from the volume manager 65 of the source node 50 to the network adapter 52 of the source node 50, across to the network adapter 72 of the target node 70 and to the volume manager 85 of the target node 70. Both the volume manager 65, 85 and the network adapters 52, 72 of the nodes 50, 70, respectively, operate outside of the user layer of the operating system. Accordingly, the model illustrated in FIG. 3 allows for internode communication of data from a kernel layer of a source node 50 directly to a kernel layer of a target node 70.

As shown in FIG. 3, the source node 50 includes a volume manager 65 within the kernel layer 66. The volume manager has two volumes 54 and 64, and three mirrors, also known as plexes 56, 58 and 68. Volume 64 communicates with plex 68 and storage device 67, and volume 54 communicates with plex 58 and plex 56. Plex 58 communicates with storage device 60 in the physical layer 69, and with the volume 54 in the volume manager 65. Plex 56 communicates with the volume 54 in the volume manager 65 and with the network adapter 52 in the physical layer 69. The volume 54 is a logical mapping of at least some of the physical devices in the node 50. Since node 50 is indicated as a source node for sending data to a target node for backup, volume 54 is configured to receive data from any plex in the node other than plex 56. Furthermore, plex 56 is technically a receiving plex in that it is configured to receive data from the volume 54 and to send the received data to the network adapter 52. Accordingly, the node structure of the source node 50 is configured to feed data to a target node in the networked computer system for backing up the data of the source node.

The target node 70 is similarly configured to the source node 50. A volume manager layer 85 is located within the kernel layer 86. The volume manager 85 has one volume 74, and two mirrors, also known as plexes 76 and 78. Plex 78 communicates with storage device 80 in the physical layer 89 and with the volume 74. Plex 76 communicates with the volume 74 and the network adapter 72. The volume 74 is a feed volume which is a logical grouping of physical devices and directs data to each of the plexes in the volume that communicate with the volume 74. Plex 76 is also known as a feed plex which acts a communication pipe for receiving data from a network adapter 72 and transferring the received data to the feed volume 74 of its associated node 70. Accordingly, the node structure of the target node is configured to receive and store data received from a source node in the networked computer system.

As shown in FIG. 3, the source node 50 is configured with a network adapter 52 in communication with one of the plexes 56 of the node 50, and the target node 70 is configured with a network adapter 72, a feed plex 76 and a feed volume 74. By configuring plex 76 to be a feed plex, data can be sent to the target node 70 from any plex in any source node 50 which has a plex in communication with the network adapter 52. The feed plex 76 is a communication pipe for receiving data. When the data is transferred from the source node 50 to the target node 70 across the network adapter, the data is received by the feed plex 76 communicating with the network adapter 72. The feed plex 76 then feeds the data received by the feed plex 76 from the source node 50 to the feed volume 74 of the target node 70. The feed volume 74 then directs the received data from the source node 50 to all other plexes in that volume. Accordingly, the connection of the plex 56 to the network adapter in the source node, and the connection of the feed plex 76 to the network adapter 72 of the target node allows backup of data in a network environment across the kernel layers of the nodes without requiring generation of multiple copies of data through the user layer of either the source or target nodes.

Figure 4:
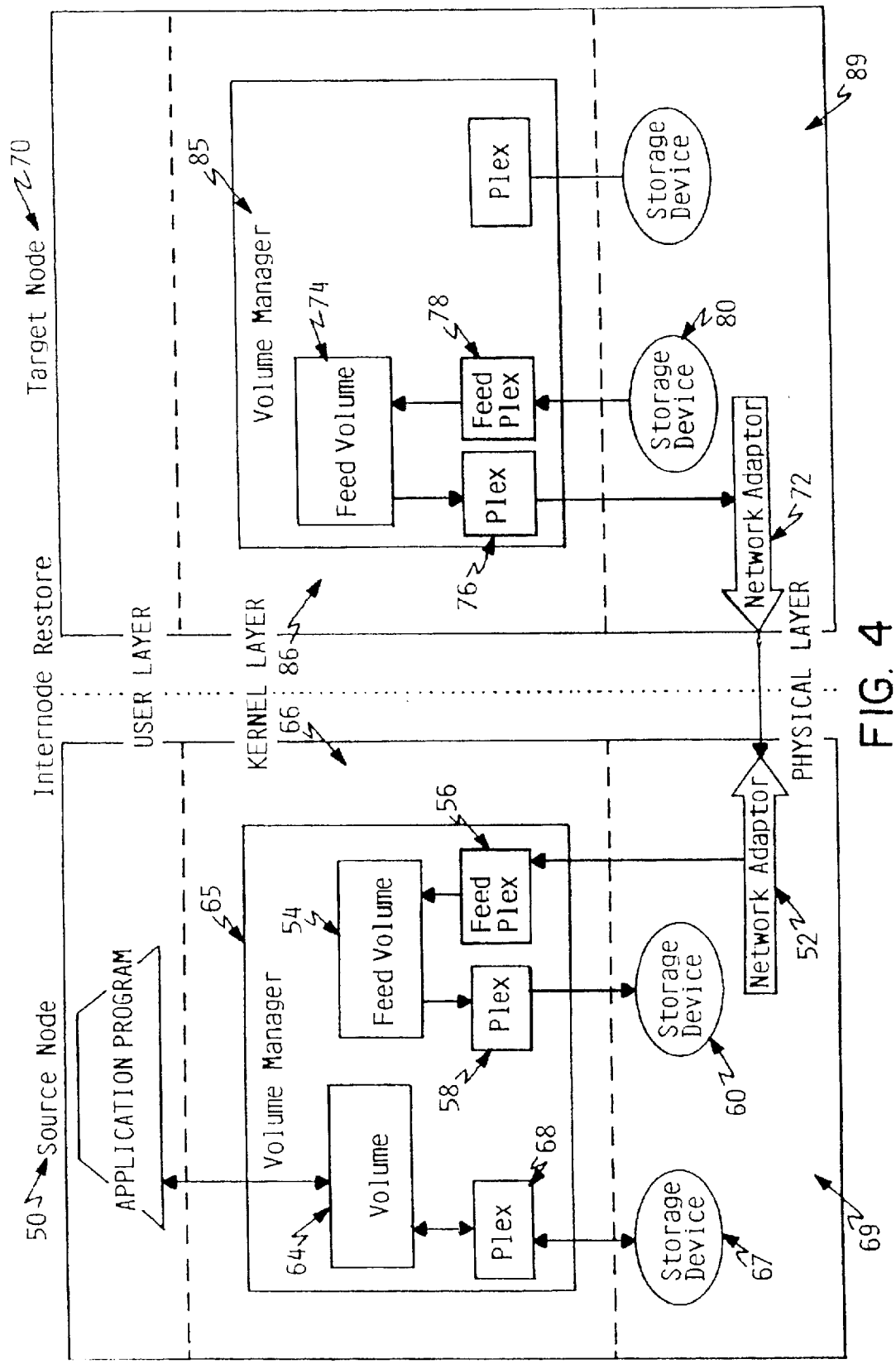
FIG. 4 is a block diagram of internode restoration of data according to the preferred embodiment.

FIG. 4 shows data being restored from a previous target node 70 onto a prior source node 50. The target node 70 is similarly configured to the target node illustrated in FIG. 3. However, plex 78 is now designated as a feed plex for communicating data from the storage device 80 to the feed volume 74. In addition, the feed plex 76 is now designated as a plex for communicating data from the feed volume 74 to the network adapter 72, plex 56 of the source node 50 is now designated as a feed plex for transferring data received from the network adapter 52 to the volume 54, and volume 54 is now designated as a feed volume. The feed plex 78 transfers previously backed up data on the storage device 80 to the feed volume 74, which transfers the data to the network adapter 72 through the plex 76. The network adapter 72 sends the previously backed up data to the network adapter 52 of the source node 50. The data received from the network adapter 52 is transferred to the feed volume 54 through the feed plex 56. The feed volume 54 then directs the received data from the target node 70 to all plexes in that volume. Accordingly, the connection of the plexes 56, 76 with the network adapters 52, 72 provides a structure for allowing restoration of data that was previously backed up on a target node across the kernel layers of the nodes, without requiring multiple copies of the data to be processed through the user layers of either operating system.

Advantages Over The Prior Art

The use of a feed plex and a feed volume transfers data across a network adapter between network nodes through the kernel layers of the target and source nodes. It permits easy backup and restoration of data using the same plex management tools normally used by system administrators to manage physical storage devices and logical data volumes. The use of the feed plex and feed volume configurations does a full backup and/or restoration of data residing in any node of the network. Furthermore, these data transfer tools allow data to be communicated between nodes at the kernel level of the operating system. This avoids copying of the data through the user layers of the operating system. Accordingly, the method and system for internode data communication avoids duplication of data at multiple layers of the system and thereby increases efficiency in data backup and restoration.

Alternative Embodiments

It will be appreciated that, although specific embodiments of the invention have been described herein for purposes of illustration, various modifications may be made without departing from the spirit and scope of the invention. In particular, the feed plex may be connected to a network adapter. This enables the feed plex to transfer data arriving through the network connection to the feed volume. The connection of the feed plex to the network adapter is a preferable configuration for backups. Alternatively, the feed plex may be connected to a backup device in which case it feeds the data from the backup device to the feed volume. This method is optimal for data restoration. In addition, the scope of the invention should not be limited to a two node system nor to a node with a minimal quantity of plexes. Each volume within a node may have multiple plexes for reading and writing data to and from the associated volume. The invention may be implemented in a multiple node system incorporating the network adapter connection for the source and target nodes in conjunction with a feed plex and a feed volume for the respective node. Accordingly, the scope of protection of this invention is limited only by the following claims and their equivalents.

I claim:

1. A method for efficiently storing data from a network on a node, comprising:
    connecting a first plex to a network device;
    connecting a second plex to a data storage device;
    grouping the plexes into a logical volume;
    receiving data from the network by the first plex; and
    storing said data on said storage device by said second plex, wherein said data is directly communicated from a kernel layer of a source node to a kernel layer of a target node.

2. The method of claim 1, further comprising configuring said node as a target node for backing up data from said network.

3. The method of claim 2, wherein said first plex is a feed plex for receiving data from a source node.

4. The method of claim 2, wherein said volume is a feed volume for writing data to said plexes.

5. The method of claim 1, further comprising configuring said node as a source node for restoring data received from a target node.

6. The method of claim 5, wherein said second plex of said target node is a feed plex for communicating data from said storage device to said logical volume of said target node.

7. The method of claim 5, wherein said first plex of said source node is a feed plex for receiving data from a target node.

8. The method of claim 5, wherein said volume of said source node is a feed volume for writing data to said plexes.

9. A computer system, comprising:
    a network device;
    a data storage device;
    a first plex connected to the network device;
    a second plex connected to the data storage device; and
    a volume connected to the first and second plexes adapted to directly communicate data from a kernel layer of a source node to a kernel layer of a target node.

10. The system of claim 9, wherein said first plex is a feed plex in a target node to manage backup of data to said volume.

11. The system of claim 10, wherein said volume is a feed volume.

12. The system of claim 9, wherein said second plex is a feed plex of a target node to manage transfer of data from said storage device to said volume.

13. The system of claim 12, wherein said first plex of a source node is a feed plex to manage restoration of data to said volume of said source node.

14. The system of claim 13, wherein said volume is a feed volume.

15. An article comprising:
    A computer-readable signal-bearing medium;
    means in the medium for connecting a network adapter of a networked computer system to a first plex;
    means in the medium for connecting a data storage device of the system to a second plex;
    means in the medium for connecting a volume to said first and second plexes; and
    means in the medium for managing a direct transfer of data from a kernel layer of a source node to a kernel layer of a target node.

16. The article of claim 15, wherein the medium is selected from the group consisting of: a recordable data storage medium and a modulated carrier signal.

17. The article of claim 15, wherein said first plex is a feed plex of a target node and said managing means backs up data from a source node to said target node.

18. The article of claim 15, wherein said first plex is a feed plex of a source node and said managing means restores data from a target node to said source node.

* * * * *

UNITED STATES PATENT AND TRADEMARK OFFICE
CERTIFICATE OF CORRECTION

PATENT NO. : 6,829,687 B2
DATED : December 7, 2004
INVENTOR(S) : Pai

It is certified that error appears in the above-identified patent and that said Letters Patent is hereby corrected as shown below:

Column 2,
Lines 26 and 27, should read -- A first aspect of the invention is a method for storing data from a network on a node. --

Column 6,
Line 41, should read -- a computer-readable signal-bearing medium; --

Signed and Sealed this

Fifth Day of April, 2005

JON W. DUDAS
*Director of the United States Patent and Trademark Office*